United States Patent
Nakatsugawa

[11] Patent Number: 6,125,365
[45] Date of Patent: Sep. 26, 2000

[54] TREE STRUCTURE ADDRESS SETTING METHOD FOR AUTOMATICALLY ASSIGNING ADDRESSES FOR A PLURALITY OF RELAY UNITS CONNECTED IN A TREE

[75] Inventor: Yoshinori Nakatsugawa, Susono, Japan

[73] Assignee: Yazaki Corporation, Tokyo, Japan

[21] Appl. No.: 09/054,074

[22] Filed: Apr. 6, 1998

[30] Foreign Application Priority Data

Apr. 7, 1997 [JP] Japan .................................. P9-088251

[51] Int. Cl.[7] .................................................. G06F 17/30
[52] U.S. Cl. ........................ 707/103; 707/101; 707/100; 710/40; 709/219; 340/825.2; 370/275; 375/212
[58] Field of Search .................................. 707/100, 101, 707/103; 710/40; 709/219; 340/825.2; 370/274; 375/212

[56] References Cited

U.S. PATENT DOCUMENTS

| | | | |
|---|---|---|---|
| 4,381,272 | 4/1983 | Ehritt | 264/40.3 |
| 4,907,188 | 3/1990 | Suzuki et al. . | |
| 5,077,554 | 12/1991 | Orita et al. | 340/825.2 |
| 5,394,556 | 2/1995 | Oprescu | 709/220 |
| 5,630,173 | 5/1997 | Oprescu | 710/40 |

FOREIGN PATENT DOCUMENTS

| | | |
|---|---|---|
| 0 275 076 | 7/1988 | European Pat. Off. . |
| 5-176378 | 7/1993 | Japan . |
| 7-123052 | 5/1995 | Japan . |
| 8-18597 | 1/1996 | Japan . |
| 8-116578 | 5/1996 | Japan . |
| WO 97/36406 | 10/1997 | WIPO . |

OTHER PUBLICATIONS

Chun–Ye Ll, et al., The Transactions of The Institute of Electronics, Information & Communication Engineer, vol. E71, No. 4, pp. 414–421, "Grammars for Rooted Acyclic Directed Graphs and their Parsing", Apr. 1988.

*Primary Examiner*—Hosain T. Alam
*Assistant Examiner*—Jean M. Corrielus
*Attorney, Agent, or Firm*—Oblon, Spivak, McClelland, Maier & Neustadt, P.C.

[57] ABSTRACT

Respective child relay units are selected in predetermined order if one or more child relay units are connected to respective relay units (first process). By increasing or decreasing an address, the increased or decreased address are set in one selected child relay unit (second process). The first process to the second process are repeated with respect to the selected child relay unit until the most downstream relay unit (third process). The third process is repeated until address setting of all child relay units has been ended in a relay unit positioned just before the most downstream relay unit in upstream (fourth process). If address setting of all child relay units has been ended in the relay unit positioned just before the most downstream relay unit, the third process to the fourth process are repeated until address setting of all child relay units has been ended in a relay unit positioned second before the upstream relay unit in the upstream.

6 Claims, 5 Drawing Sheets

TREE STRUCTURE ADDRESS SETTING METHOD FOR AUTOMATICALLY ASSIGNING ADDRESSES FOR A PLURALITY OF RELAY UNITS CONNECTED IN A TREE

BACKGROUND OF THE INVENTION

1. Field of the Invention

The present invention relates to a tree structure address setting method for executing automatically addressing for a plurality of relay units connected via a tree structure and a system for embodying the same.

2. Description of the Prior Art

In the prior art, as an address setting method, there has been a method set forth in Patent Application Publication (KOKAI) Hei 8-116578, for example. In this address setting method, each of plural universal head controllers which are connected like a chain receives an address assignment command and an address initial value from an upstream side, then registers a received address value as an own address and increments the address value, and then transmits the incremented address value and the address assignment command to a downstream side. As a result, the addresses of the adjacent relay units can be incremented sequentially.

Further, as a tree structure address setting method, there has been a method set forth in Patent Application Publication (KOKAI) Hei 7-123052, for example. In this address setting method, addresses which are ordered hierarchically by designating a management unit as an uppermost layer are assigned previously to the management unit and all relay units, and addresses equivalent to the above addresses assigned to the management unit and the relay units in the uppermost hierarchy out of plural interconnectable relay units are set automatically to modems respectively.

Furthermore, as a terminal address automatic setting method, there has been a method set forth in Patent Application Publication (KOKAI) Hei 5-176378, for example. In this method, addresses are set by using time as a variable.

In addition, an address setting method for a communication system including serial connections and branch connections, there has been a method set forth in Patent Application Publication (KOKAI) Hei 8-18579, for example. In this method, a base station calls mobile sets, which are positioned in one connection column of the serial connections or branch connections, sequentially in the order in which the mobile set is positioned closer to a base station. If a response is returned from the mobile set, the base station transmits an address setting signal to the concerned mobile set so as to set an address in the concerned mobile set and such procedure is repeated. On the contrary, if no response is returned from the mobile set, the base station then calls the mobile sets, which are positioned in other connection column of the serial connections or branch connections, in the order in which the mobile set is positioned closer to the base station, and then the base station transmits the address setting signal to the mobile set which has sent out the response so as to set the address in the concerned mobile set.

However, the method set forth in Patent Application Publication (KOKAI) Hei 8-116578 has disclosed the address setting method for the relay units which are connected like a chain and the method set forth in Patent Application Publication (KOKAI) Hei 8-18579 has disclosed the address setting method for the communication system including serial connections and branch connections, but they have not disclosed an address setting for a plurality of relay units which are connected to have a tree structure.

Conversely, the method set forth in Patent Application Publication (KOKAI) Hei 8-116578 has surely disclosed the tree structure address setting method, but it has not disclosed a method which enables address setting of a plurality tree structure relay units automatically in a short time at all.

In addition, in the method set forth in Patent Application Publication (KOKAI) Hei 5-176378, the sequence of the addresses cannot be predicted. Therefore, in a complicated system which includes a large number of relay units, it is anticipated that the address setting in respective relay units becomes difficult.

SUMMARY OF THE INVENTION

The present invention has been made in view of the above circumstances, and it is an object of the present invention to provide a tree structure address setting method for executing automatically addressing for a plurality of relay units connected via a tree structure in a short time and a system for embodying the same.

In order to achieve the above object of the present invention, there is provided a tree structure address setting method of setting addresses in respective relay units of a plurality of relay units connected to construct a tree structure, comprising the steps of: a) selecting respective child relay units in predetermined order if one or more child relay units are connected to respective relay units; b) increasing or decreasing an address, and then setting the increased or decreased address in one selected child relay unit; c) repeating step a) to step b) with respect to the selected child relay unit until a most downstream relay unit; d) repeating step c) until address setting of all child relay units has been ended in a relay unit positioned just before a most downstream relay unit in upstream; and e) repeating step c) to step d) until address setting of all child relay units has been ended in a relay unit positioned second before the upstream relay unit in an upstream if address setting of all child relay units has been ended in the relay unit positioned just before the most downstream relay unit.

According to the present invention, since the addresses are set sequentially in respective relay units according to the above procedures, address setting of the plurality of relay units can be executed automatically in a short time.

In the preferred embodiment of the present invention, the relay unit decides whether or not child relay units which are connected are operating, and then sets addresses in operating child relay units.

In the preferred embodiment of the present invention, in the step a), the relay unit selects the child relay units sequentially from a closest child relay unit to the relay unit.

In order to achieve the above object of the present invention, there is provided a tree structure address setting system for setting addresses in respective relay units of a plurality of relay units connected to construct a tree structure, each of the relay units comprising: address setting means for setting an address received from a relay unit positioned just before in an upstream as own address; retrieving means for retrieving in sequence unaccessed child address registers of child address registers which are provided to correspond to one or more child relay units to be connected to own relay unit; writing means for writing addresses, which are obtained by increasing or decreasing own addresses being set by the address setting means, into the unaccessed child address registers retrieved by the retrieving means; transmitting means for transmitting the addresses, which have been written into the child address registers being retrieved, to the child relay units which correspond to the child address registers being retrieved; and transferring means for transferring address setting process to a relay unit positioned just before a current relay unit in the upstream when retrieval of all the unaccessed child address registers has been ended.

According to the present invention, since the relay units have respective means mentioned above, address setting of the plurality of relay units connected to construct the tree structure can be executed automatically in a short time.

In the preferred embodiment of the present invention, each of the relay units further comprises deciding means for deciding whether or not the child relay units are operating, and wherein, if it is decided by the deciding means that the child relay units which correspond to the unaccessed child address registers retrieved by the retrieving means are operating, the writing means writes the addresses which can be obtained by increasing or decreasing own address being set by the address setting means.

In order to achieve the above object of the present invention, there is provided a relay unit out of a plurality of relay units which are connected to construct a tree structure, the relay unit comprising: address setting means for setting an address received from a relay unit positioned just before in an upstream as own address; retrieving means for retrieving in sequence unaccessed child address registers of child address registers which are provided to correspond to one or more child relay units to be connected to own relay unit; writing means for writing addresses, which are obtained by increasing or decreasing own addresses being set by the address setting means, into the unaccessed child address registers retrieved by the retrieving means; transmitting means for transmitting the addresses, which have been written into the child address registers being retrieved, to the child relay units which correspond to the child address registers being retrieved; and transferring means for transferring address setting process to a relay unit positioned just before a current relay unit in the upstream when retrieval of all the unaccessed child address registers has been ended.

The nature, principle and utility of the invention will become more apparent from the following detailed description when read in conjunction with the accompanying drawings.

DESCRIPTION OF THE PREFERRED EMBODIMENTS

Figure 1:
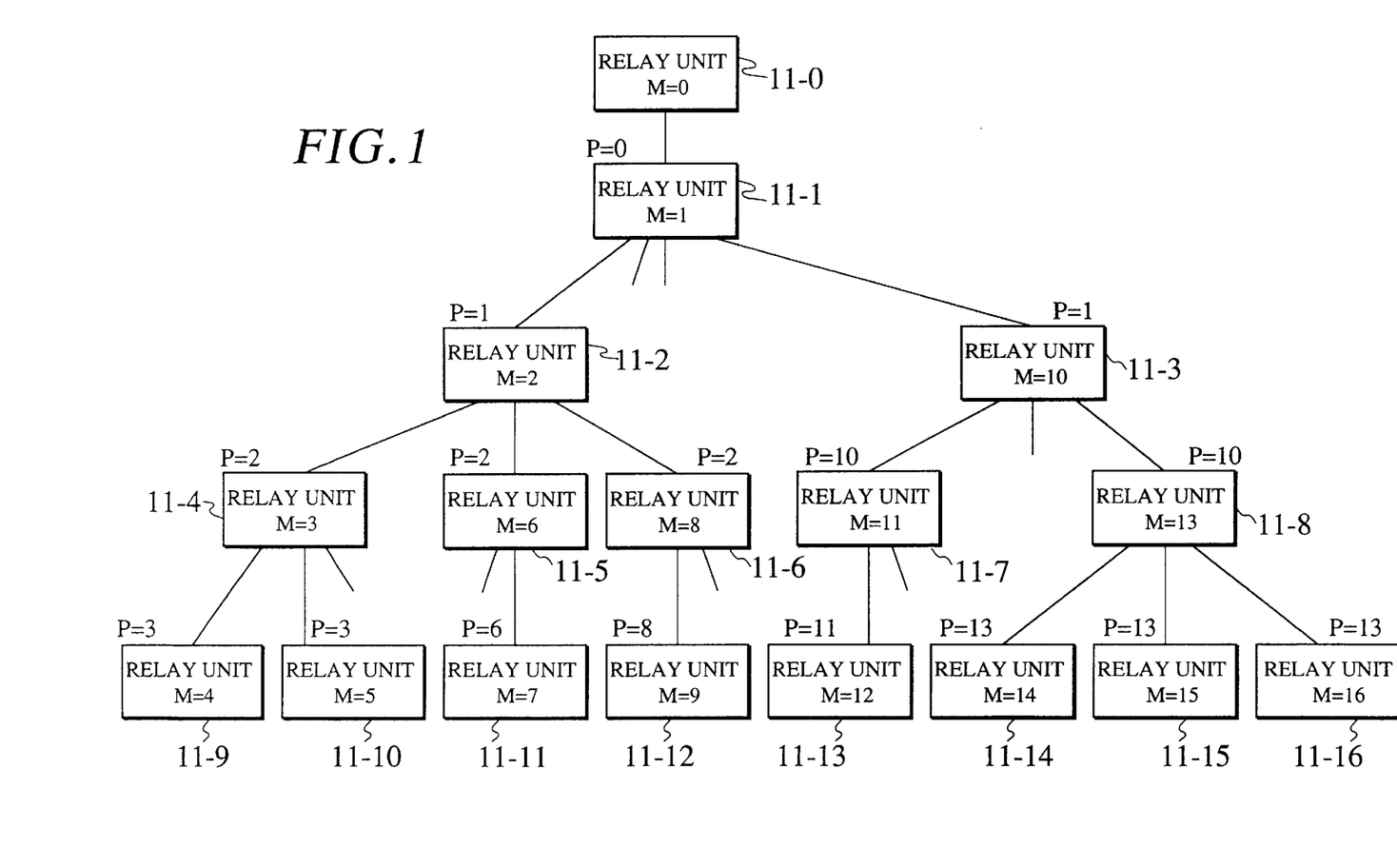
FIG. 1 is a view showing a configuration of a communication system to which an embodiment of a tree structure address setting system of the present invention is applied.

A tree structure address setting method and a system for embodying the same according to the present invention will be explained with reference to the accompanying drawings hereinafter. FIG. 1 shows a configuration of a communication system to which an embodiment of the tree structure address setting system is applied.

In the communication system shown in FIG. 1, a plurality of relay units 11-0 to 11-16 which are connected to construct a tree structure (hierarchical structure) are provided. This communication system can carry out address setting (addressing) of the plurality of relay units automatically.

The relay unit 11-1 is connected to the relay units 11-0 as its child relay unit, and the relay unit 11-2 and the relay unit 11-3 are then connected to the relay unit 11-1 as its child relay units. Then, the relay unit 11-4, the relay unit 11-5, and the relay unit 11-6 are then connected to the relay unit 11-2 as its child relay units, and similarly the relay unit 11-7, and the relay unit 11-8 are then connected to the relay unit 11-3 as its child relay units.

The relay unit 11-9, and the relay unit 11-10 are then connected to the relay unit 11-4 as its child relay units, and the relay unit 11-11 is connected to the relay units 11-5 as its child relay unit, and the relay unit 11-12 is connected to the relay units 11-6 as its child relay unit. Similarly, the relay unit 11-13 is connected to the relay units 11-7 as its child relay unit, and the relay unit 11-14, the relay unit 11-15 and the relay unit 11-16 are then connected to the relay unit 11-8 as its child relay units.

In the plurality of tree structure relay units, a position relationship is established such that the relay unit positioned in the upstream just before an objective relay unit is a parent relay unit for such objective relay unit and also the relay unit positioned in the downstream just behind the objective relay unit is the child relay unit for such objective relay unit.

Figure 2:
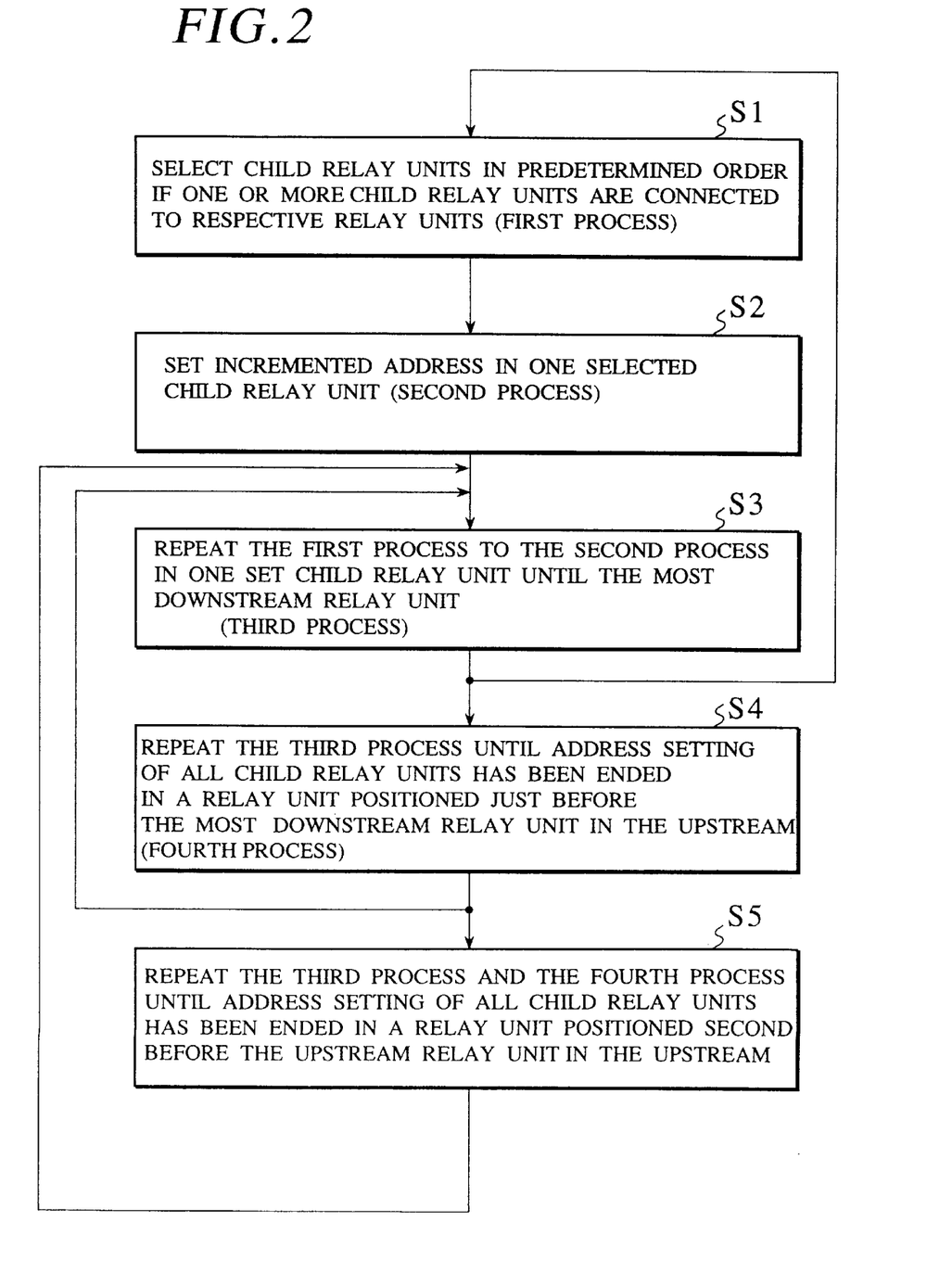
FIG. 2 is a flowchart showing an embodiment of a tree structure address setting method of the present invention.

FIG. 2 is a flowchart showing procedures performed in the case where the tree structure address setting method of the present invention is applied to the communication system in FIG. 1. Details of the flowchart will be explained later.

Figure 3:
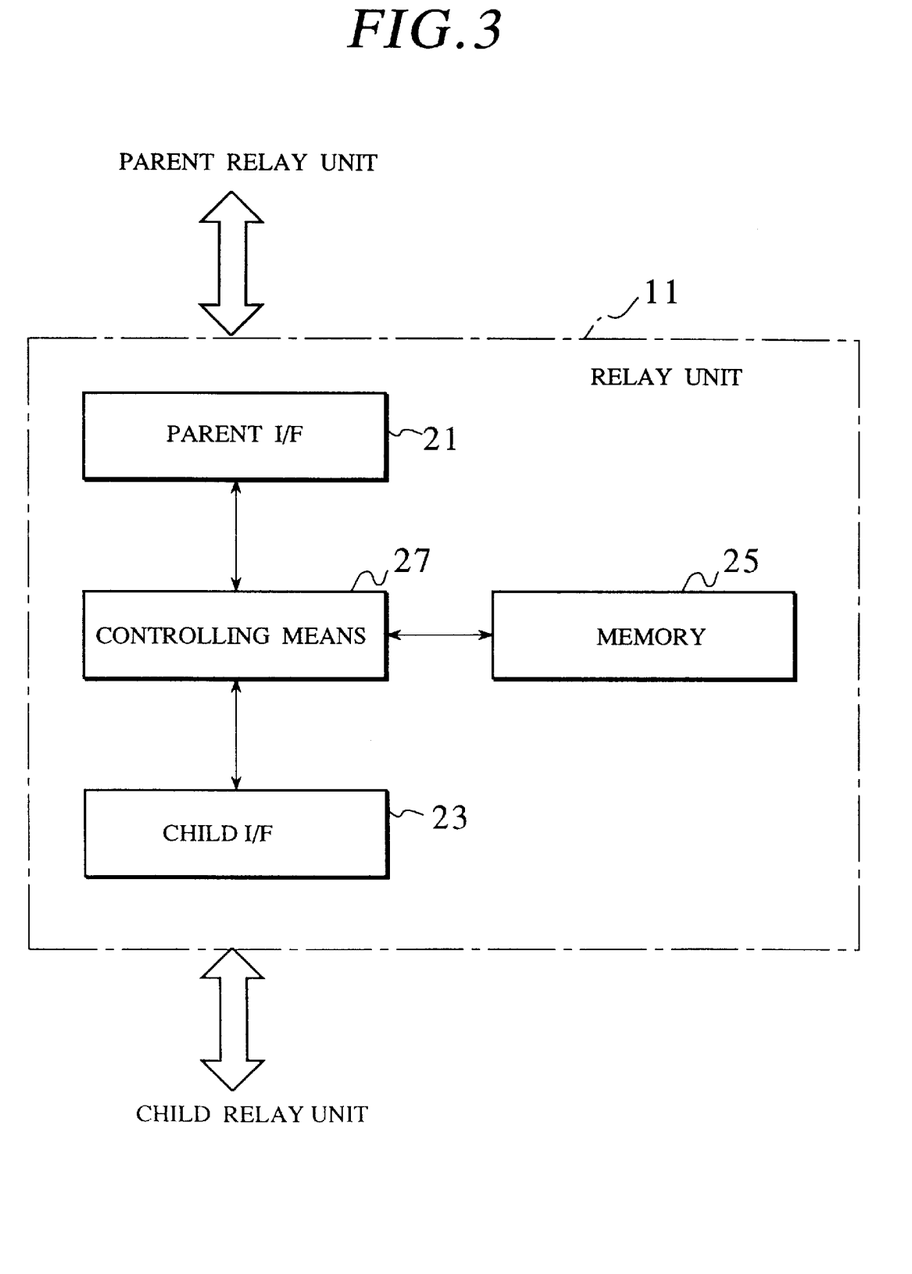
FIG. 3 is a view showing a configuration of each relay unit.

A configuration of each relay unit is shown in FIG. 3. Each relay unit 11 (11-0 to 11-16) comprises a parent interface (referred to as a "parent I/F" hereinafter) 21 connected to a parent relay unit positioned in the upstream, a child interface (referred to as a "child I/F" hereinafter) 23 connected to a child relay unit positioned in the downstream, a memory 25 for storing information necessary for address setting of the relay unit, and a control means 27 for controlling the parent I/F 21, the child I/F 23, and the memory 25 to carry out address setting of the relay unit automatically.

Figure 4:
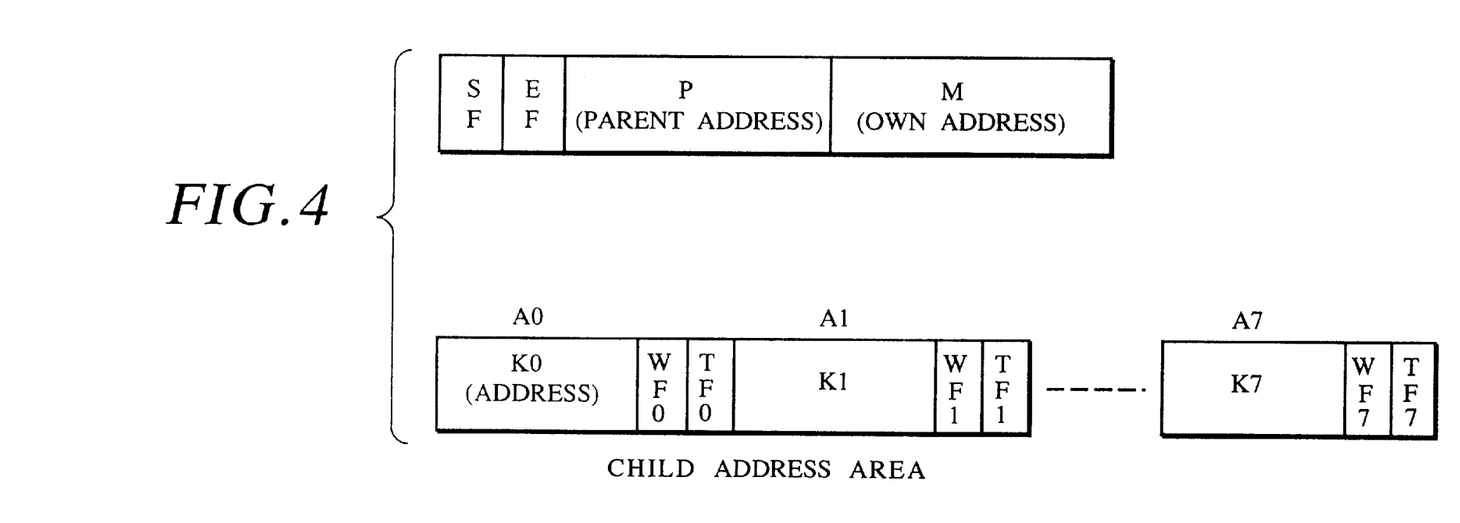
FIG. 4 is a view showing a memory map of a pertinent portion of a memory in the relay unit.

FIG. 4 shows a memory map of a pertinent portion of the memory in the relay unit. The memory 25 of the relay unit comprises a start flag SF area, an end flag EF area, a parent address P area, a own address M area, and a child address area. If the child relay units are connected to the parent relay unit up to a maximum of eight units, for example, the child address area includes child address registers A0 to A7 in which child addresses K0 to K7 are stored, and write flags WF0 to WF7 and transmit flags TF0 to TF7 both assigned to the child addresses respectively.

Figure 5:
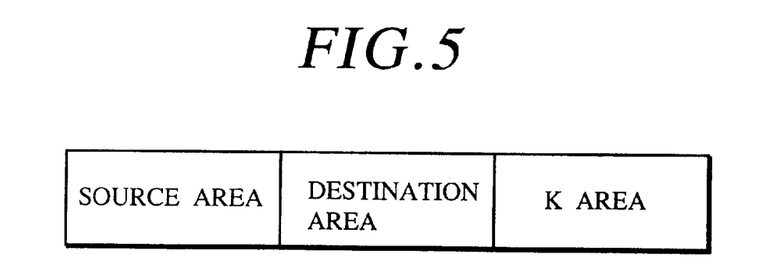
FIG. 5 is a view showing a configuration of a cyclic command.
Figure 6:
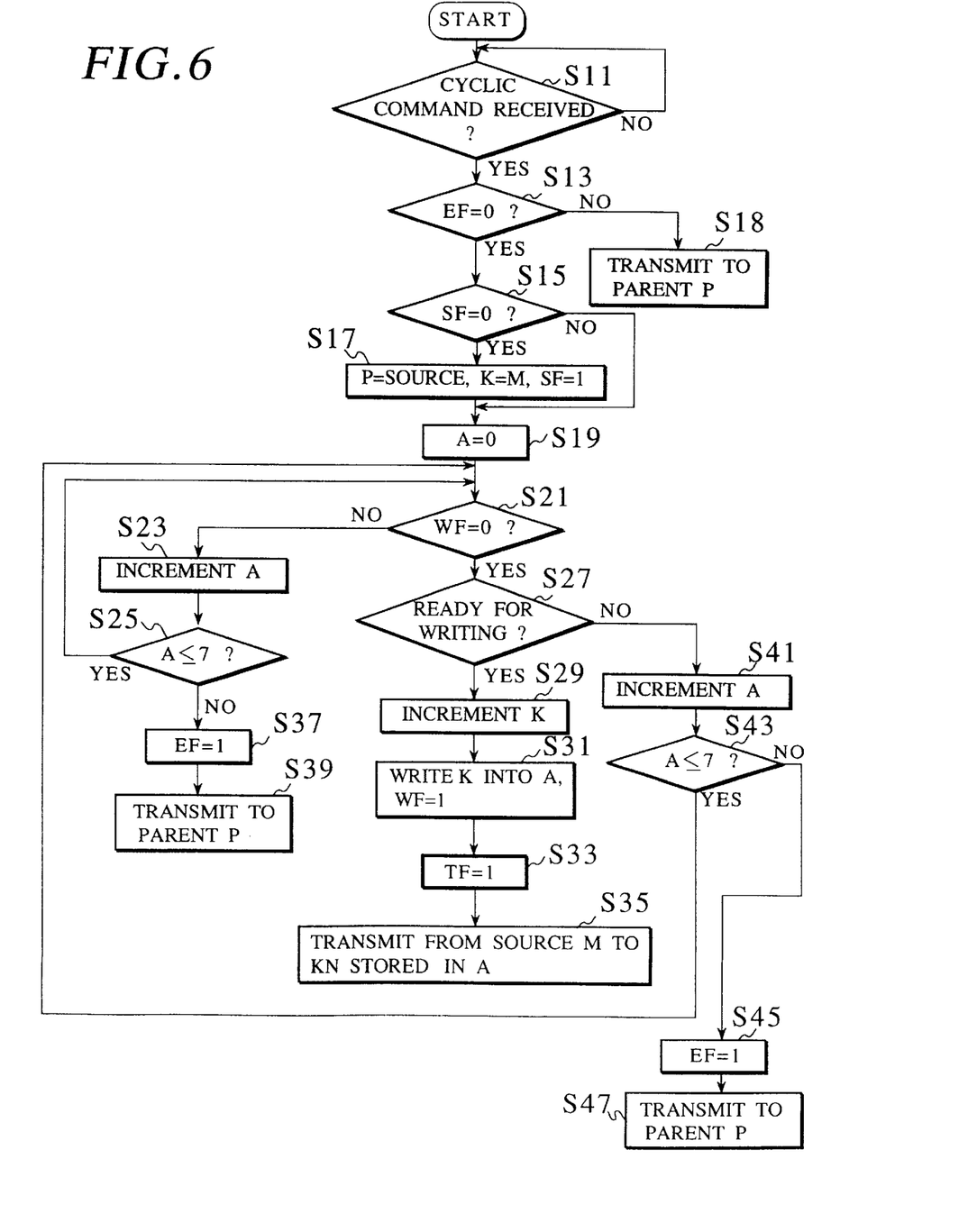
FIG. 6 is a flowchart showing process procedures of address setting in each relay unit.

FIG. 5 shows a configuration of a pertinent portion of a cyclic command. The cyclic command shown in FIG. 5 includes a source area, a destination area, and a K area. A flowchart showing process procedures of address setting in each relay unit is shown in FIG. 6. With reference to FIG. 6, the address setting method in each relay unit will be explained. Respective processes in the flowchart shown in FIG. 6 can be executed by the controlling means 27 in each relay unit.

At first, when a power supply (not shown) is turned on, the memory 25 is reset to "0". Then, it is decided whether or not each relay unit has received the cyclic command (step S11). The cyclic command may be received from either the parent relay unit via the parent I/F 21 or the child relay unit via the child I/F 23. When the relay unit has received the cyclic command, it decides whether or not the end flag EF in own memory 25 is set to "0" (step S13).

If the end flag EF is "0", it is then decided whether or not the start flag SF is set to "0" (step S15). If the start flag SF is "0", the child address registers A0 to A7 are accessed for the first time. Therefore, the parent address P is set in the source area, a value written in the K area is set as own address M, and the start flag SF is set to "1" (step S17). The process executed in this step S17 constitutes an address setting means.

If the end flag EF is "1" in step S13, access of the child address registers A0 to A7 has been completely ended. Therefore, the cyclic command is transmitted to the parent relay unit (step S18).

Next, A is set to "0" (step S19). In other words, the child address register A0 is pointed. Then, it is decided whether or not the write flag WF is "0" (step S21). Unless the write flag WF is "0", A is incremented (step S23). Then, it is decided whether or not the incremented A exceeds "7" (step S25). That is to say, it is decided whether or not the child address registers have been accessed up to the child address registers A7. The processes executed from step S21 to step S25 correspond to the case where the incremented A is equal to or less than "7" and the write flag WF is "0", i.e., unaccessed child address registers are retrieved by such processes. The processes executed from step S21 to step S25 constitute a retrieving means.

In unaccessed child address registers, according to that the child relay unit is operating or not, it is decided whether or not the child address can be written into the child address registers (step S27). The process executed in step S27 constitutes a deciding means.

If it has been decided in step S27 that the child relay unit is operating, the child address can be written into the unaccessed child address registers and K is incremented (step S29). Then, the incremented K is written into the child address register A and at the same time the write flag WF is set to "1" (step S31). The processes in step S29 and step S31 constitute a writing means.

Besides, the transmission flag TF is set to "1" (step S33). The cyclic command is transmitted from the source M (i.e., own relay unit) to the child relay unit which corresponds to one Kn selected from the addresses K0 to K7 of the child relay units stored in the child address registers A0 to A7 (step S35). The processes executed in step S33 and step S35 constitute a transmitting means.

When A has been incremented up to "8" in step S25, the end flag EF is set to "1" (step S37). Then, the cyclic command is transmitted to the parent relay unit positioned Just before own relay unit in the upstream (step S39). In other words, the process returns to the parent relay unit. The processes executed in step S37 and step S39 constitute a transition means. In addition, in the parent relay unit which has received the cyclic command, unaccessed child address registers are retrieved like the above process and similar processes are conducted.

On the contrary, if it has been decided in step S27 that the child relay unit is not operating, it is impossible to execute the writing and thus A is incremented (step S41). It is decided whether or not the incremented A exceeds "7" (step S43). If the incremented A is equal to or less than "7", the process returns to step S21.

Then, when A has been incremented up to "8", the end flag EF is set to "1" (step S45) and then the cyclic command is transmitted to the parent relay unit Just before own relay unit in the upstream (step S47).

In this manner, if respective processes in the flowchart shown in FIG. 6 are carried out by the relay units, the addresses are set in the plural tree structure relay units shown in FIG. 1 in compliance with the flowchart shown in FIG. 2.

At first, in respective relay units, it is decided whether or not one or more child relay units have been connected to the relay unit. If one or more child relay units have been connected to the relay unit, the child relay units are selected in predetermined sequence (step S1). This process corresponds to step S23 and step S25 in FIG. 6.

Next, the incremented address is set in one selected child relay unit (step S2). This process corresponds to step S29 to step S35 in FIG. 6. In addition, in one child relay unit in which the address is set, the process in step Si to the process in step S2 are repeated until the most downstream relay unit (step S3).

If the processes from step S1 to step S3 has been executed, in the plural tree structure relay units shown in FIG. 1, own addresses M are set in the leftmost child relay units from the most upstream layer to the most downstream layer in order of lower number.

More particularly, own address "M=0" is set in the relay unit 11-0, own address "M=1" is set in the relay unit 11-1, own address "M=3" is set in the relay unit 11-4, and own address "M=4" is set in the most downstream relay unit 11-9.

Next, in the relay unit just before the most downstream relay unit in the upstream, the process in step S3 has been repeated until address setting has been completed in all the child relay units (step S4). The process in step S4 will be conducted in the following. When the address setting in the most downstream relay unit 11-9 has been ended, the process returns to the parent relay unit 11-4 for the relay unit 11-9 and then own address "M=5" is set via the relay unit 11-4 in the relay unit 11-10 as the second child relay unit from the left.

Further, the process returns to the parent relay unit 11-4 for the relay unit 11-10, and then the process returns to the parent relay unit 11-2 for the relay unit 11-4 since address setting of all child relay units has been ended in the parent relay unit 11-4.

Then, in the relay unit positioned in the upstream just before the relay unit which is positioned just before the most downstream relay unit in the upstream, the process in step S3 and the process in step S4 are repeated until address setting of all the child relay units has been completed (step S5). The process in step S5 is performed as follows.

More particularly, own address "M=6" is set via the relay unit 11-2 in the relay unit 11-5 as the second child relay unit from the left, and own address "M=7" is set in the child relay unit 11-11 for the relay unit 11-5. In addition, own address "M=8" is set via the relay unit 11-2 in the relay unit 11-6 as the third relay unit from the left, and own address "M=9" is set in the child relay unit 11-12 for the relay unit 11-6.

In the same way, the incremented addresses are set automatically in sequence in respective relay units until the relay unit 11-16.

Like the above, since the processes from step S1 to step S5 are repeated and it can be decided whether or not all the relay units have been connected in an operable manner, all address setting in all the relay units can be performed automatically while preventing that addresses are assigned overlappingly to all operable relay units.

Besides, processes are repeated such that, after addresses have been set in the relay units from the most upstream relay unit to the most downstream relay unit, the process returns to the relay unit positioned just before the most downstream relay unit in the upstream and address setting is performed in the relay unit. Hence, address setting can be carried out in a shorter time.

Furthermore, a plurality of child relay units connected to a relay unit are set sequentially from the left (in other words, in order of distance from the relay unit(parent relay unit)). Therefore, when the relay unit calls the child relay units, the relay unit can call them sequentially from the closest child relay unit. Hence, calling also can be carried out in s shorter time.

Meanwhile, in the case that either new relay units are connected further to the plurality of relay units which are connected to construct a tree structure shown in FIG. 1 or new operating relay units are added, address setting of respective relay units can be carried out automatically in a new communication system by executing again the processes of the relay units in the flowchart shown in FIG. 6 and also the processes in the flowchart shown in FIG. 2.

In this case, child addresses should be assigned previously to new child relay units which are to be connected to respective relay units. Then, it is decided whether or not the new child relay units have been connected to the concerned relay units. If the new child relay units have been connected to the concerned relay units, own addresses may be set in the new child relay units.

In the example shown in FIG. 1, own addresses have been set in respective relay units while incrementing (increasing) own addresses as the process goes from the most upstream relay units to the downstream relay units. However, own addresses may be set in respective relay units, for example, while decrementing (decreasing) own addresses as the process goes from the most upstream relay units to the downstream relay units.

It should be understood that many modifications and adaptations of the invention will become apparent to those skilled in the art and it is intended to encompass such obvious modifications and changes in the scope of the claims appended hereto.

What is claimed is:

1. An automatic tree structure address setting method of setting addresses in respective relay units of a plurality of relay units of a plurality of relay units connected to construct a tree structure, comprising the steps of:
   a) selecting respective child relay units in a predetermined order if at least one child relay units is connected to a respective relay unit;
   b) increasing an address, and then setting the increased address in one selected child relay unit;
   c) repeating step a) to step b) with respect to the selected child relay unit until an address of a most downstream relay unit is set;
   d) repeating step c) until the setting of address of all child relay units has ended in a relay unit positioned just before a most downstream relay unit in an upstream path; and
   e) repeating step c) to step d) until the setting of all child relay units has ended in a relay unit positioned second before the upstream relay unit in an upstream path if address setting of all child relay units has been ended in the relay unit positioned just before the most downstream relay unit.

2. A tree structure address setting method of claim 1, wherein the relay unit decides whether or not child relay units which are connected are operating, and then sets addresses in operating child relay units.

3. A tree structure address setting method of claim 1, wherein, in the step a), the relay unit selects the child relay units sequentially from a closest child relay unit to the relay unit.

4. An automatic tree structure address setting system for setting addresses in respective relay units of a plurality of relay units connected to construct a tree structure, each of the relay units comprising:
   address setting means for setting an address received from a relay unit positioned just before in an upstream as own address;
   retrieving means for retrieving in sequence unaccessed child address registers of child address registers which are provided to correspond to at least one child relay units to be connected to own relay unit;
   writing means for writing addresses, which are obtained by increasing own addresses being set by the address setting means, into the unaccessed child address registers retrieved by the retrieving means;
   transmitting means for transmitting the addresses, which have been written into the child address registers being retrieved, to the child relay units which correspond to the child address registers being retrieved; and
   transition means for transferring address setting process to a relay unit positioned just before a current relay unit in the upstream when retrieval of all the unaccessed child address registers has been ended.

5. An automatic tree structure address setting system as in claim 4, wherein each of the relay units further comprises deciding means for deciding whether or not the child relay units are operating, and
   wherein, if it is decided by the deciding means that the child relay units which correspond to the unaccessed child address registers retrieved by the retrieving means are operating, the writing means writes the addresses which can be obtained by increasing own address being set by the address setting means.

6. A relay unit out of a plurality of relay units which are connected to construct a tree structure, the relay unit comprising:
   automatic address setting means for setting an address received from a relay unit positioned just before in an upstream as own address;
   retrieving means for retrieving in sequence unaccessed child address registers of child address registers which are provided to correspond to at least one child relay units to be connected to own relay unit;
   writing means for writing addresses, which are obtained by increasing own addresses being set by the address setting means, into the unaccessed child address registers retrieved by the retrieving means;
   transmitting means for transmitting the addresses, which have been written into the child address registers being retrieved, to the child relay units which correspond to the child address registers being retrieved; and
   transition means for transferring address setting process to a relay unit positioned just before a current relay unit in the upstream when retrieval of all the unaccessed child address registers has been ended.

* * * * *

UNITED STATES PATENT AND TRADEMARK OFFICE
CERTIFICATE OF CORRECTION

PATENT NO. : 6,125,365
DATED : September 26, 2000
INVENTOR(S) : Yoshinori Nakatsugawa

It is certified that error appears in the above-identified patent and that said Letters Patent is hereby corrected as shown below:

column 6, line 3, change "Just" to --just--;
    line 19, change "Si" to --S1--;
    line 23, change "has" to --have--.
column 7, line 16, change "s" to --a--.
    line 48, in second occurrence, delete "of a plurality of relay units";
    line 51, change "units" to --unit--;
column 8, line 19 change "units" to --unit--;
    line 52 change "units" to --unit--

Signed and Sealed this

Twenty-second Day of May, 2001

Attest:

NICHOLAS P. GODICI

Attesting Officer     Acting Director of the United States Patent and Trademark Office